United States Patent [19]

Greenwood et al.

[11] 4,315,662
[45] Feb. 16, 1982

[54] UNDERCARPET WIRING SYSTEM INSTALLATION KIT

[75] Inventors: William S. Greenwood, Nutley; Ted L. C. Kuo, Fanwood; Raymond F. Piasecki, Leonardo, all of N.J.

[73] Assignee: Thomas & Betts Corporation, Raritan, N.J.

[21] Appl. No.: 42,539

[22] Filed: May 25, 1979

[51] Int. Cl.³ .................... H01R 11/20; H01R 4/24
[52] U.S. Cl. ............................. 339/97 C; 339/17 F; 339/113 R; 174/88 R
[58] Field of Search .................. 339/17 E, 17 F, 121, 339/132 B, 96–99, 176 MF, 113 R, 113 B; 174/88 R, 36; 33/174 B, 174 G, 180 R

[56] References Cited

U.S. PATENT DOCUMENTS

| | | | |
|---|---|---|---|
| 2,360,304 | 10/1944 | McLoughlin | 339/113 B |
| 3,155,809 | 11/1964 | Griswold | 29/628 X |
| 3,462,542 | 8/1969 | Richter | 339/17 F |
| 3,469,016 | 9/1969 | Shelton | 174/36 |
| 3,697,925 | 10/1972 | Henschen | 339/176 MF X |
| 3,891,293 | 6/1975 | Jones | 339/97 C |
| 3,960,430 | 6/1976 | Bunnell | 339/97 C |
| 3,984,621 | 10/1976 | Propst | 174/48 |
| 4,002,393 | 1/1977 | Merry | 339/97 C |
| 4,030,801 | 6/1977 | Bunnell | 339/132 B X |
| 4,054,353 | 10/1977 | Saunders | 339/176 MF |

FOREIGN PATENT DOCUMENTS 2254395 5/1974 Fed. Rep. of Germany.

OTHER PUBLICATIONS

Publication; Electronic Design, p. 24 Oct. 15, 1958, title "Cable Connections the Easy Way".
Publication; "Under Carpet Power and Communication Wire System", Fleischhacker, Nov. 18–1975.
Pub. "Flat Cable: Under-Carpet Break-Through", Building Design & Construction, Apr. 79, pp. 26–29.
Pub. "The Great Cover-Up" undated.
Pub. "TUCC System" undated.
Pub. "Flat Conductor Cable Bldg. Wiring Sys.", NASA.
Pub: "A Better Way to Wire" Telephony, 1–8–79.
Pub: "Tentative Int. Amend. to the 1978 National Elect. Code," NFPA, Jan. 1978.
MSFC–Spec–494A, 4–30–73.
NASA TMX–64916, Mar. 1975.
NASA TMX–64887, Aug. 1974.
NASA SP–5120, Dec. 1974 pp. 28–29.

*Primary Examiner*—John McQuade
*Assistant Examiner*—John S. Brown
*Attorney, Agent, or Firm*—Robert M. Rodrick; Jesse Woldman

[57] ABSTRACT

An installation kit for wiring systems includes flat multi-conductor cable having a displaceable overlying shield and a connection guide adapted for receiving first and second cables in mutually overlapped, shield-displaced relation and limiting connection of conductors to preselected connection zones.

12 Claims, 12 Drawing Figures

UNDERCARPET WIRING SYSTEM INSTALLATION KIT

FIELD OF THE INVENTION

This invention relates generally to the installation of wiring systems and more particularly to a group of interrelated components for use in installing flat multiconductor cable systems for undercarpet use.

BACKGROUND OF THE INVENTION

One presently known type of undercarpet cable system includes a flat multiconductor cable which is assembled between a plastic shield and a metallic shield. The cable assembly, comprising the cable and its two protective shields, is installed between a floor and overlying carpeting. The multiconductor cable includes a plurality of flat electrical conductors which are contained in a casing comprised of a thin sheet of electrical insulation. The plastic shield provides a cushion for the multiconductor cable so as to resist the abrasion and possible piercing of the cable insulation by projections extending upwardly from the floor, such projections being especially prevalent if the floor is made of concrete or a similar coarse building material. The metallic shield resists piercing of the cable insulation by an object inserted through the carpet. By electrically grounding the metallic shield, any electrically conductive object which may pierce the metallic shield and contact a "hot", i.e., electrically energized, conductor of the multiconductor cable will be grounded so as to protect a person who contacts the object from electrical hazard.

Inasmuch as the multiconductor cable and the two shields may not be positively attached to each other either before, during or after their installation, there is the possibility that the cable could be installed without the shields or that, once installed, the shields could move relative to the cable, thereby leaving a portion of the cable exposed either aside the metallic shield or the plastic shield. Such exposed cable runs a greater risk of being pierced than a properly covered cable and, therefore, presents an electrical hazard.

Where the metallic shield is properly positioned above the cable, there remains the possibility that the metallic shield will not be properly grounded, for instance, by failure to electrically connect it to ground. Like a properly grounded shield which is improperly installed so as to expose a portion of the cable, a cable having a nongrounded metallic shield presents a potentially hazardous situation.

Such known undercarpet wiring system includes a network of cable assemblies, the individual cable assemblies being electrically connected. In such a system, the metallic shield of each assembly is grounded by use of connectors for electrical connection of adjoining metallic shields. In such arrangement, shield grounding integrity is dependent on physical continuity of the shield. Thus, if the shield is interrupted as by cutting, the free remnant of the shield will not be electrically continuous to ground, with resulting hazard.

In such known system, connections between cables are made, in tap or splice configuration, by arranging the cables in mutually abutting relation. For instance, a tap connection of two five-conductor cables is prepared by arranging the five conductors of a first cable perpendicular to the conductors of a second cable and in abutment with a side margin of the second cable. Insulation-piercing connectors are now placed beneath each conductor of the first cable, each connector being of different size from all others so as to extend into registry under a different conductor of the second cable. The connectors are then crimped into electrical engagement with each cable. Difficulty attends this practice, particularly in the need for such different size connectors and the fact that all but one of the connectors span plural conductors of the second cable, giving rise to possible interphase short circuitry.

SUMMARY OF THE INVENTION

The present invention has as its object the provision of interrelated components which will facilitate installation of undercarpet cable systems of nature improved from the foregoing system.

In attaining this and other objects, the subject disclosure provides a kit of parts inclusive of flat electrical cable having a plurality of conductors of common width in an electrically insulative casing. A shield displaceably overlies and extends with the casing and is electrically connected to one of the cable conductors. In use, the cable is selectively perforated, as by apparatus also forming part of such kit and discussed below. Connectors are provided of type having insulation piercing expanse related to conductor width and are introduced in such perforation, then to be crimped onto the cable. The kit further includes flat spacers configured in manner to receive, and thus electrically insulate, the portions of crimped connectors which are exterior to the cable. The kit finds particular use in the connection of separate such cables through taps and splices. In this use, perforation apparatus disclosed herein leads an installer to perforate conductors of each of the cables in unison in preselected pattern. The perforation apparatus forms perforations of size compatible with dimensions of the connectors, which are in turn compatible with the cable conductor width. The spacers are formed preferably with recesses in pattern conforming to the perforation pattern established by the perforation apparatus.

The foregoing and other objects and features of the present disclosure will be further evident from the following detailed discussion and from the drawings wherein like reference numerals identify like parts throughout.

DESCRIPTION OF PREFERRED EMBODIMENTS

Figure 1:
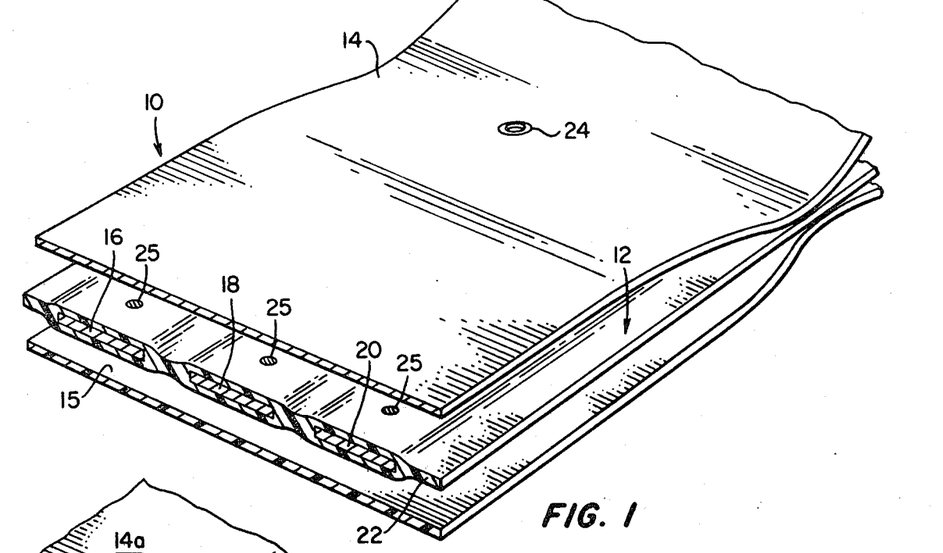
FIG. 1 is a perspective view of an electrical cable assembly of multiconductor type having overlying shield secured thereto.

Referring to FIG. 1, flat multiconductor cable assembly 10 to be installed underneath a carpet (not shown) or some other similar type of floor covering, includes a multiconductor cable 12 containing a plurality of flat electrical conductors 16, 18, 20, which are contained within a casing constituted by a thin sheet 22 of electrical insulation. The insulation 22 is preferably made from a laminate of polyester and polyvinylchloride. The polyvinylchloride is about four mils thick and is contiguous with the conductors 16, 18, 20, while the polyester is about one and one-half mils thick and forms the outer surface of the cable 12. The conductors 16, 18, 20, which are made from copper or any other good electrically conductive material, extend side-by-side along the entire length of the multiconductor cable 12.

In the embodiment shown in FIG. 1, the conductors 16 and 20, adjacent to the opposite longitudinally extending edges of the multiconductor cable 12, may be employed as hot conductors, the middle conductor 18 serving as a ground conductor. The ground conductor 18 is permanently connected, both mechanically and electrically, to the metallic shield 14 by a plurality of welds 24 which are arranged at intervals along the length of the cable assembly 10. Alternatively, the ground conductor 18 may be electrically and mechanically connected to the metallic shield 14 by a plurality of spaced-apart rivets or any other suitable fasteners. Also, the multiconductor cable 12 and the metallic shield 14 could be electrically and mechanically connected along the entire length of the cable assembly 10, so that the connection is continuous rather than intermittent. Indicia, such as color coded markings 25, may be provided on the insulation 22 above and below the conductors 16, 18, 20 to distinguish them from each other.

The metallic shield 14 is made from a thin sheet of good electrically conductive metal, such as copper. Preferably, the metallic shield 14 and the conductors 16, 18, 20 are made from the same metal to prevent galvanic corrosion between the metallic shield 14 and the ground conductor 18. The metallic shield 14 functions as a protective barrier for resisting piercing of the multiconductor cable 12 by an object inserted through an overlying carpet. Even if a metallic object were to penetrate the metallic shield 14 and contact one of the hot conductors 16 and 20, the hot conductor will be grounded through the shield 14 and the ground conductor 18.

The plastic shield 15 is employed to provide a cushion for the multiconductor cable 12. As such, the plastic shield 15 can be made of any suitable flexible plastic, such as polyester, sufficiently strong to protect the multiconductor cable 12 from abrasion and possible piercing as a result of its installation on a floor, especially if the floor is made from concrete. The plastic shield 15, which may be permanently attached to the multiconductor cable 12 in any suitable manner, also inhibits the penetration of the multiconductor cable 12 by any projections extending upwardly from the floor. Preferably, shield 15 is secured to cable 12 insulation by heat-sealing thereof at locations spaced lengthwise of the shield.

The selective securement of shield 14 to cable 12 at locations mutually spaced lengthwise of the cable gives rise to successive shield extents which are respectively unsecured and secured to the cable. Thus, the extent of shield 14 downwardly of weld 24 in FIG. 1 is not secured to the cable. The successive extent of shield 14, i.e., adjacent weld 24, is secured to the cable. The next successive shield extent, upwardly of weld 24 in FIG. 1 is again not secured to the cable. This pattern preferably repeats along the cable length, with uniform or nonuniform shield extents, giving rise to redundant electrical connection of shield 14 to cable 12. Electrically conductive means are in registry with each secured shield extent. For example, the body of material comprising weldment 24, extends through the cable insulative casing, opposed terminal portions of the body having electrical connection to the shield and to an exclusive one of the cable conductors, respectively.

Figure 2:
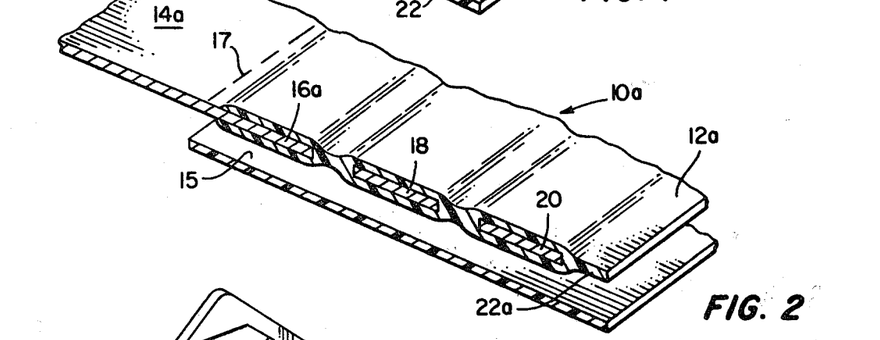
FIG. 2 is a perspective view of an alternative embodiment of the FIG. 1 cable assembly wherein the shield is bendable into overlying relation to the cable conductors.

In the FIG. 2 embodiment, cable assembly 10a includes cable 12a, the leftward conductor 16a of which travels outboard of insulative casing 22a to provide a shield 14a for the cable. Such outboard part of conductor 16a is bendable about bend line 17 to overlie cable 12a and may be secured in such overlying disposition by a suitable mechanical clamp. Thus, both shields 14 and 14a are in displaceably overlying relation to their associated cables, whereby the cable may be exposed temporarily for connection to another cable. In both instances, however, electrical continuity exists as between each shield and a cable conductor on displacement of the shield from such overlying disposition.

Figure 3:
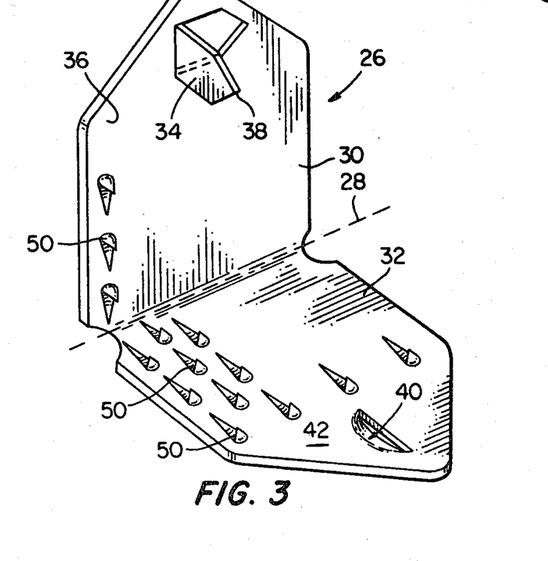
FIG. 3 is a perspective view of a connector for use in joining flat cables.
Figure 4:
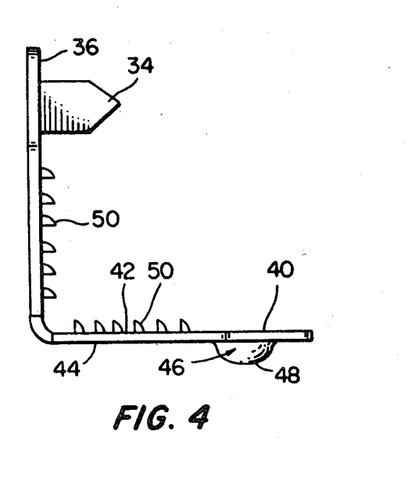
FIG. 4 is a side elevational view of the FIG. 3 connector.

In FIGS. 3 and 4 a self-locking clamp member 26 in accordance with the present disclosure is particularly useful for making electrical contact with the conductors of flat conductor cable. FIG. 3 shows the clamp member 26 as including a bendable member adapted to bend along a bending line 28 to define first and second arm portions 30, 32. In this preferred embodiment, the entire member 26 is metallic so as to be suitable for conducting electricity when the clamp member 26 is attached to and makes electrical contact with a conductor of flat conductor cable.

The first arm portion 30, of the self-locking clamp member is provided with a bendable tab 34, which extends away from the surface 36 of the first arm portion 30. In the embodiment shown, the tab 34 has been punched or stamped out of the first arm portion 30, and also is of a pentagonal shape. The tab 34 has a sharp tip 38 for piercing of a flat conductor cable when the first and second arm portions 30, 32 are closed, as more fully described hereinbelow. The tab 34 is shown extending perpendicular to the bending line 28 of the clamp member 26 which gives it the greatest strength to resist bending of the tab 34 back to its original position, in surface 36 upon engagement with opening 40 but does not prevent proper folding of the tab 34. Tab 34 could also be positioned perpendicular to the present tab 34 position if strengthened by ribs, bending, etc. to prevent unwanted folding. The opening 40 would then similarly be turned 90 degrees from the position shown in FIG. 3.

The second arm portion 34 is provided with an opening 40 therethrough which is arranged with respect to the bending line 28 so as to be adapted to receive the tab 34 when the bendable member 26 is bent along the bending line 28 to move the first and second arm portions 30, 34 towards one another. As best seen in FIG. 3, in the surface 42 of the second arm portion, the opening 40 is elongated, having a longitudinal dimension substantially corresponding to the width of the tab 34. On the opposite surface 44 of the second arm portion 32, there is provided a closing means 46 for bending of the tab 34 when the first and second arm portions 30, 32 are moved together and the tab 34 enters and passes through the opening 40.

In the embodiment shown, this closing means 46 comprises a hood 48 which has been stamped or punched out of the second arm portion 32. Hood 48 overlies a portion of the opening 40 with the hood inner surface being curved to provide a camming action to cause bending of the tab 34 when the two arm portions 30, 32 move together. In essence, this hood camming surface serves to change the direction of travel of the tab as the tab enters and passes between the first and second surfaces 42, 44 of the second arm portion 32. Initially, the tab enters the opening 40 substantially normal to the first surface 42 of the second arm portion and the hood camming surface causes the tab to exit at an acute angle with respect to the second surface 44 of the second arm portion 32. Hood 48 also provides a further important function—namely, it compensates for manufacturing tolerance problems since the tab may not be made consistently at 90 degrees to the surface 36 but may vary. The hood thus accepts a degree of misalignment that an unhooded slot could not.

Insulation-piercing teeth 50 extend outwardly of surfaces 36 and 42 to penetrate the insulative casings of cables to be connected on crimping of the clamp connector of FIGS. 3 and 4 and to thereupon electrically engage cable conductors. Further details of this particular connector is set forth in copending commonly-assigned United States application Ser. No. 42,441, filed on May 25, 1979 entitled "Self-Locking Clamp Member", to which incorporating reference is hereby made.

Figure 5:
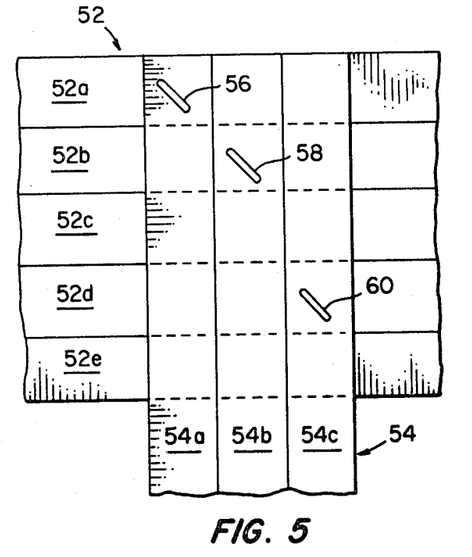
FIG. 5 is a plan view of a pair of flat cables with perforations made therethrough as indicated.
Figure 6:
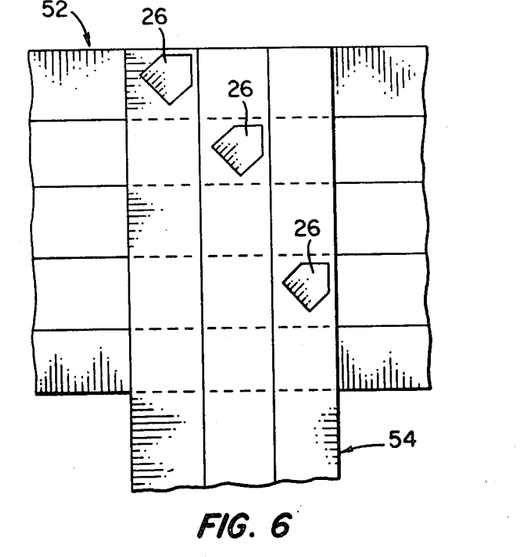
FIG. 6 is a plan view, as in FIG. 5, but with connectors introduced and crimped.

In FIG. 5, two flat cables 52, 54 are shown overlapped and with their shields displaced to permit connection. Perforations 56, 58 and 60 are made through both cables, respectively in registry with conductors 52a and 54a, 52b and 54b and 52d and 54c. In FIG. 6 connectors 26 are shown inserted in such perforations and crimped onto the upper insulation of cable 54 and the under insulation of cable 52, thereby electrically connecting the conductors in registry with the perforations.

Figure 7:
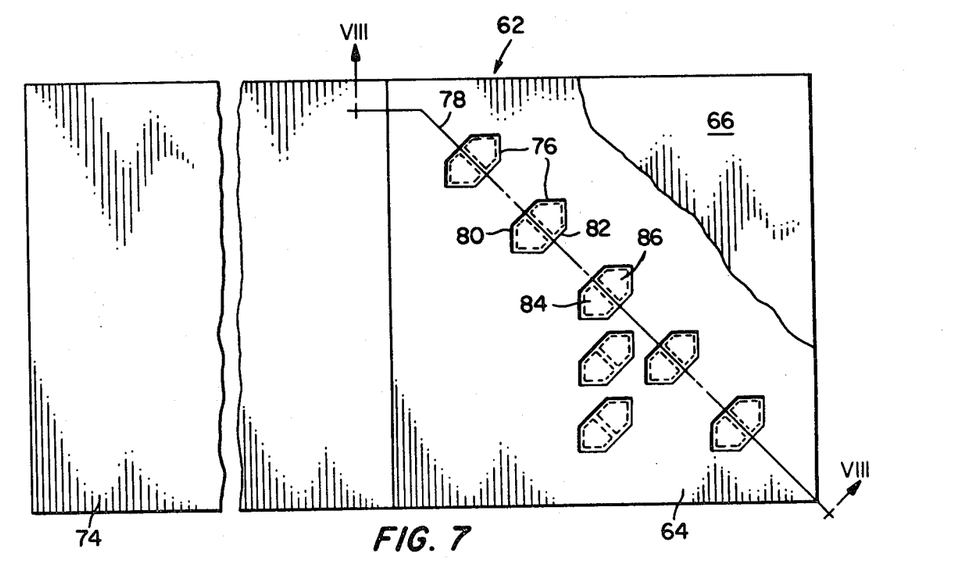
FIG. 7 is a plan view of a flat spacer having patterned recesses.
Figure 8:
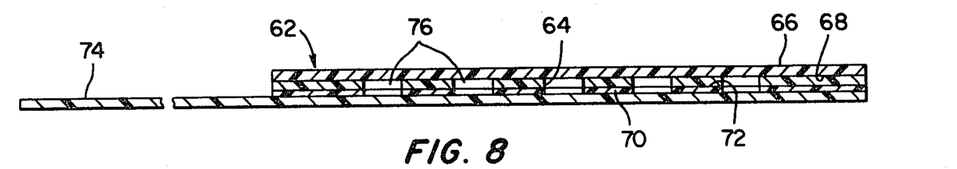
FIG. 8 is a sectional view taken along line VIII—VIII of FIG. 7.

In FIGS. 7 and 8, insulator 62 includes a spacer 64, a thin clear film of electric insulation 66 laminated to one face 68 of the spacer 64, a layer of pressure-sensitive adhesive 70 applied to an opposite face 72 of the spacer 64, and a liner 74 removably attached to the adhesive 70.

The spacer 64 is preferably made from a relatively noncompressible, electric insulating material, such as polyvinylchloride. Spacer 64 is sized and shaped so as to completely cover and overhang overlapping portions of a pair of flat multiconductor cables. Although the spacer is shown as being square in FIG. 7, it can have any other suitable shape depending upon the configuration of the overlapping portions of the cables.

A plurality of holes 76 extend through the spacer 64 between the faces 68, 72 thereof. The holes 76 are sized, shaped, and arranged so as to receive connectors 26 (see FIGS. 4, 5 and 6 which electrically and mechanically connect the overlapping portions of the cables. Tracking between the connectors 26 is inhibited by the spacer 64.

Each of the holes 76 has an elongated hexagonal shape which is symmetrical about a line 78 perpendicular to and bisecting the two opposite parallel sides 80, 82 of the holes so that each of the holes is divided into two mirror-image portions 84, 86. Each of the portions 84, 86 has a generally pentagonal shape which matches the pentagonal shape of at least one of a pair of arms 30, 32 of a corresponding one of the connectors 26, so that each of the connectors can be arranged in a corresponding one of the holes in either of two different orientations as indicated by dotted lines in FIG. 7 with respect to the line 78. The size and shape of the holes may be varied depending upon the size and shape of the connectors.

The film 66 of electric insulation can be made from any suitable material, such as a laminate of polyvinylchloride and polyester adapted for lamination to the spacer 64. Alternatively, the film 66 can be formed monolithically with the spacer 64.

In order to prevent the film 66 from being pierced or punctured by the arms of the connectors 26, the film is supported a predetermined substantially fixed distance from the arms of the connectors by the spacer 64. The thickness of the spacer 64 may be varied to vary the distance between the film and the arms of the connectors as long as the film is positioned above the arms of the connectors so as to avoid being cut by the arms of the connectors.

The liner 74 prevents the inadvertent sticking of the pressure-sensitive adhesive 70 to the cables or other objects. Preferably, the liner is made from a piece of clear plastic.

Further details concerning the insulator-spacer of FIGS. 7 and 8 may be had by reference to copending commonly-assigned United States application, Ser. No. 42,538, filed on May 25, 1979, entitled "Insulator for Covering Electric Cables", to which incorporating reference is hereby made.

Referring again to FIGS. 5 and 6, the five-to-three conductor single-phase tap therein carries neutral (conductors 52a, 54a), ground (conductors 52b, 54b) and phase B (conductors 52d, 54e). Phase A (conductor 52c) and phase C (conductor 52e) are not carried through from cable 52 to cable 54. Perforations 56 and 58 are preferably invariantly made in indicated position, such that neutral may be carried throughout a system as being to the right of the grounding conductor in the running direction and spaced from the hot lines by the grounding conductor. The connection guides of FIGS. 9, 10 and 12 are effective for enforcing this discipline, by compelling the use of certain connection zones (fifteen zones are provided in the five-by-three matrix of FIGS. 5 and 6) and limiting the probability of erroneous connections.

Figures 9, 12:
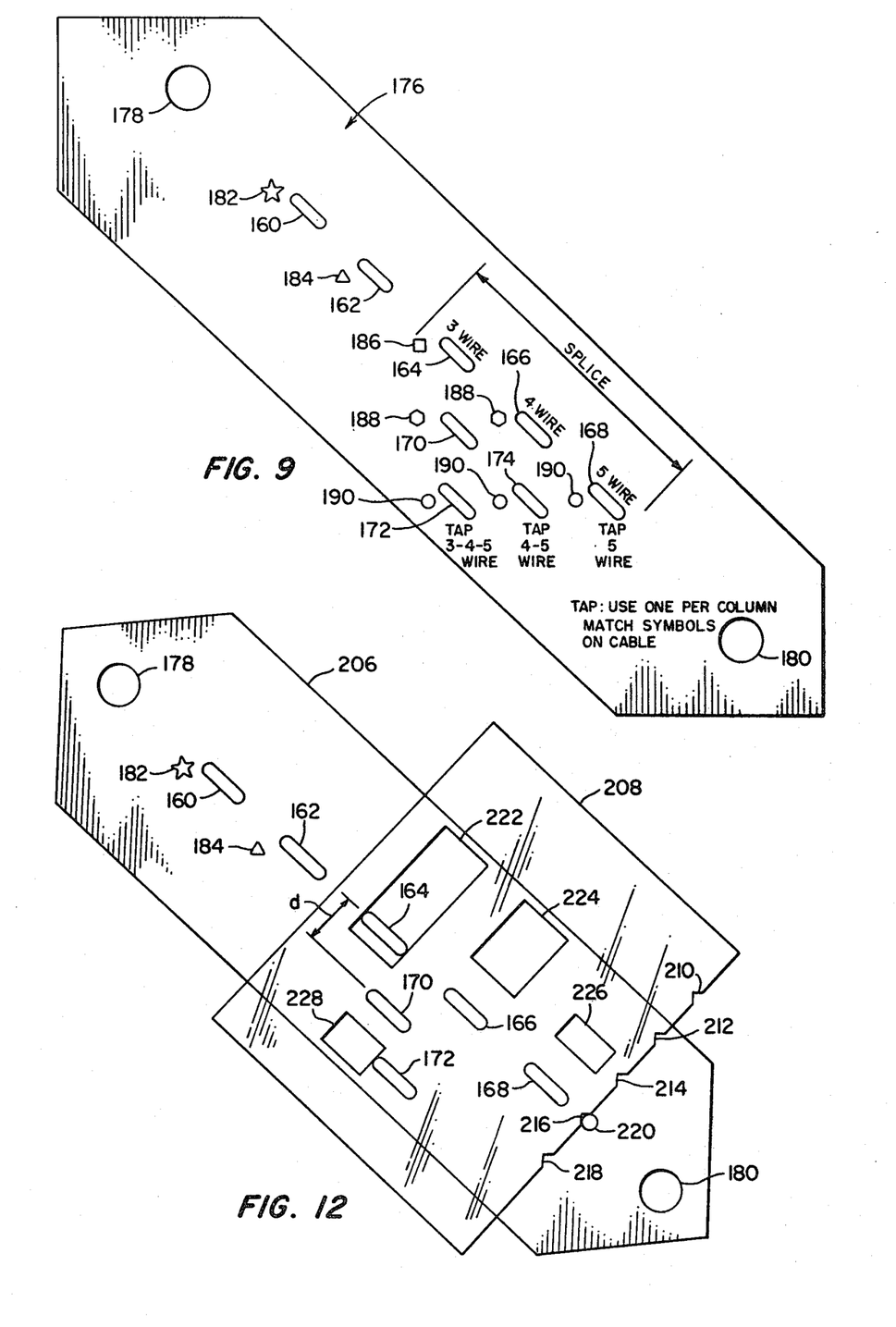
FIG. 9 is a plan view of a perforation guide.
FIG. 12 is a plan view of a further perforation guide.
Figure 10:
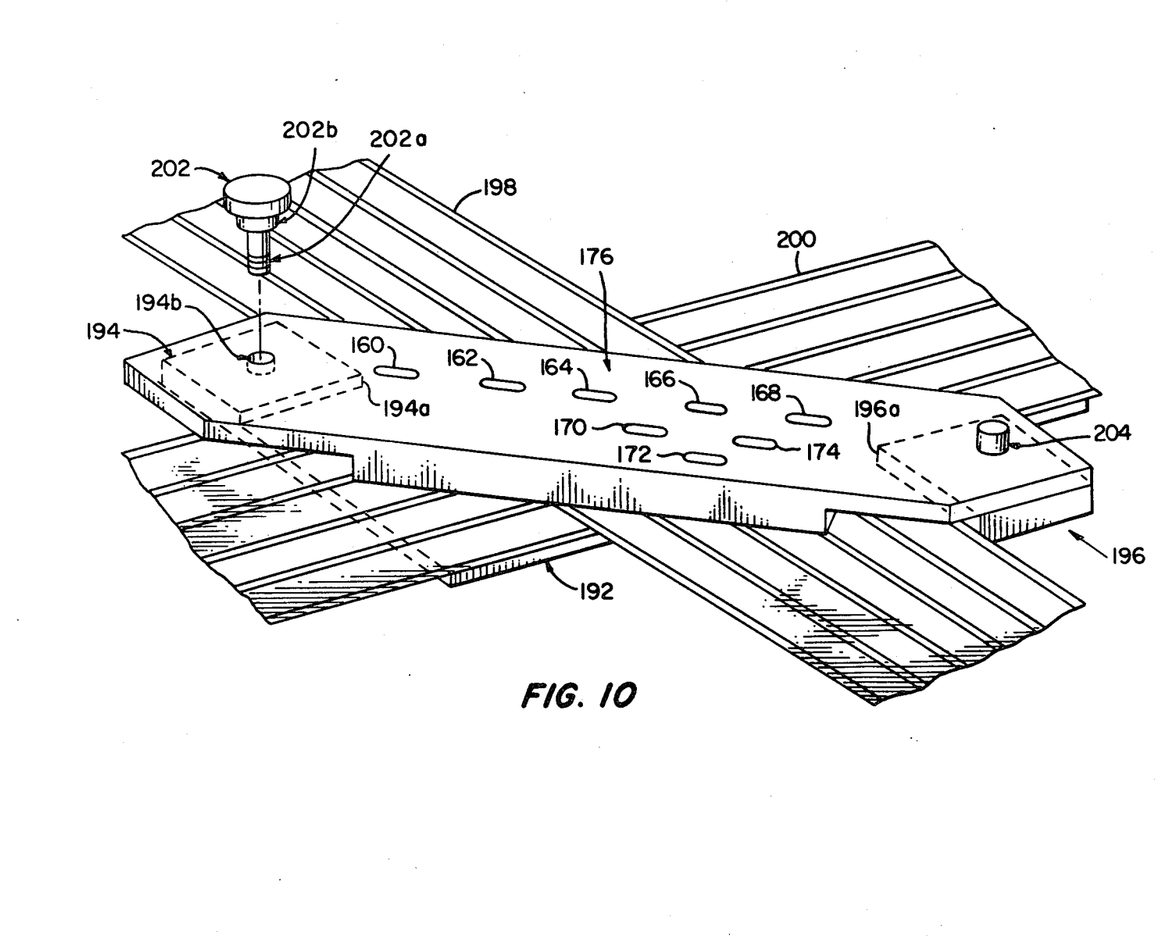
FIG. 10 is a perspective view of the FIG. 7 guide in conjunction with a pair of flat cables.

In FIG. 9, a plate member 176 incorporates slots 160–174 in indicated pattern. Registration holes 178 and 180 are provided at ends of plate 176 and the plate includes discriminating indicia 182, in the form of a star, 184, in the form of a triangle, 186, in the form of a square, 188, in the form of a hexagon and 190, in the form of a circle. Conductors of the cable of FIG. 1 bear corresponding indicia. Additionally, plate 176 bears literal indications adjacent various slots. The term "SPLICE" encompasses slots 164, 166 and 168 and the slots respectively bear terms "3 WIRE", "4 WIRE" and "5 WIRE". Under the verticle column including slots 164, 170 and 172, the plate bears the legend "TAP 3-4-5 WIRE". The vertical column including slots 166 and 174 bears the legend "TAP 3-4-5 WIRE". Beneath slot 168 is the legend "TAP 5 WIRE". Adjacent hole 180 is the legend "TAP: USE ONE PER COLUMN MATCH SYMBOLS ON CABLE".

As noted above, cable markings are invariantly made through slots 160 and 162. In the case of a splice, i.e., connection of two longitudinally aligned and overlapping cables, slots 164-168 are used depending upon the number of wires in the conductors.

In the case of a tap, i.e., connection of two cables in overlapping and orthogonal relation, all slots may be used. Proper connections and maintenance of polarity is assured by simple recognition of the indicia. Each indicium is uniquely colored to further facilitate proper connections. Table 1 indicates the various connection possibilities achievable.

TABLE 1

| Slots | Connection(s) Achieved |
| --- | --- |
| 160,162 and 164 | three conductor cable to three conductor cable splice (phase A) three conductor cable to three, four or five conductor cable tap (phase A) |
| 160, 162, 164 and 166 | four conductor cable to four conductor cable splice (phases A and B) four conductor cable to four or five conductor cable tap (phases A and B) |
| 160, 162, 164 166 and 168 | five conductor cable to five conductor cable splice (three phase) five conductor cable to five conductor cable tap (three phase) |
| 160, 162 and 170 | three conductor cable to four or five conductor cable tap (phase B) |
| 160, 162, 172 | three conductor cable to five conductor cable tap (phase C) |
| 160, 162, 170 and 174 | four conductor cable to five conductor cable tap (phases B and C) |
| 160, 162, 164 and 174 | four conductor cable to five conductor cable tap (phases A and C) |

In FIG. 10, plate 176 is shown with cooperative structure providing therewith an installation tool. For convenience, the literal legends and indicia are omitted, but would be included in the device. Base 192 is formed with upwardly extending cable guides 194 and 196, which receive cables 198 and 200 and place the cables in proper orientation with respect to the slot pattern in plate 176. Thus, the cables are made mutually orthogonal and slots 160-168 register with a line extending between edge corners 194a and 196a of guides 194 and 196. Guide 194 has a threaded bore 194b for receipt of pin 202 having threaded end 202a and shoulder 202b. Pin 204 may be fixedly secured to guide 196 to serve as a pivot for movement of plate 176 into operative position whereupon pin 202 is threaded into guide 194.

Figure 11:
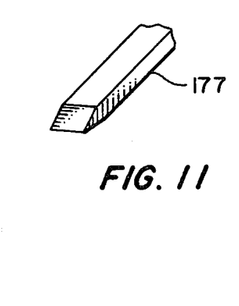
FIG. 11 is a punch for the FIG. 7 guide to provide therewith perforation apparatus.

In the FIG. 10 arrangement, base 192 preferably functions as a die and has slots in its upper surface in pattern and configuration conforming with the slots 160-174 of plate 176. To perforate the cables a punch (element 177 in FIG. 11) or punches would be inserted in the guide holes in plate 176 in the positions which provide the proper perforations for the connection to be made. Application of an appropriate force or forces to the punch or punches would then create the desired perforation pattern in the cables. Base 192 preferably includes a removable tray for collection of matter thus punched out of the cables. Connectors of type shown in FIG. 3 would then be inserted and crimped to complete the connection.

In preferred practice, the stencil indicia are colored as follows: 182 white; 184 green; 186 black; 188 red; and 190 orange. Cable insulation over conductors is correspondingly colored, e.g., for a five-conductor cable: neutral-white; ground-green; phase A-black; phase B-red; and phase C-orange.

The arrangement of FIG. 12 includes connection guide 206 which has a slot pattern modified from that of FIG. 9 by omission of slot 174 thereof and by omission of all instructional indicia other than that adjacent slots 160 and 162. The omitted slot had sole use in a four-to-five tap and such capability remains through slots 170 and 172. Selector plate 208 overlies guide 206 and includes side notches 210-218, notch 216 being shown in registry with detent 220 of guide 206. Plate 208 has openings 222, 224, 226 and 228 therethrough for rendering accessible only selective of the connection guide openings. While shown as transparent, the plate is desirably opaque.

As in the case of FIG. 9, slots 160 and 162 are used in all connections of cables. In the position shown for plate 208, phase A only is available, use of slots other than slots 160, 162 and 164 being precluded since such other slots are not in registry with any of openings 222-228. On the other hand, if plate 208 is indexed to place notch 218 in engagement with detent 218 in engagement with detent 220, with the plate and guide still in orthogonal relation, slot 170 is now alone exposed through plate 208. Phase B thus is made available for a three-conductor tap. The indexing distance, i.e., the spacing between peaks of adjacent notches, is the distance d (FIG. 12) established by the slot pattern in guide 206. The extent and position of openings 222-228 is preselected to provide the desired variety of connections. The following table is further expositive of indexing of plate 208.

TABLE 2

| INDEXED NOTCH | SLOTS FOR USE |
| --- | --- |
| 210 | 160, 162 and 172 |
| 212 | 160, 162, 164 and 166 |
| 214 | 160, 162, 164, 166 and 168 |
| 216 | 160, 162 and 164 |
| 218 | 160, 162 and 170 |

The connections achieved with the indicated slots are noted above in Table 1.

As will be seen, practice wherein neutral and ground connections are in respective singular connection zones of the matrix of connection zones results in repetitive selection of neutral and ground connection zones, i.e., identical geometry in separate connections of a first pair and a second pair of cables, thus carrying polarization throughout an entire installed system. This practice may be restricted to connection of a single pair of conductors to a specific repetitive zone, e.g., an outermost conductor of each cable. While mutual orthogonality of cables is preferred, other alignment is within the purview of the invention. Also, zone selection pattern may be other than a diagonal of the matrix.

In the aspect of the foregoing disclosure wherein connection guiding is by stencil or the like, far less than all of the connection zones of the matrix are employable. Connection of at least one pair of conductors is effected by preclusion of use of zones other than a singular zone. In this case, the connection guide has an aperture in registry with such singular zone and continuous surface expanse extending in directions mutually perpendicular from such aperture. Connection of at least one other conductor pair is compelled to less than all zones with which such conductors are in registry. In this case, the connection guide has plural apertures in registry with a common conductor of a cable, i.e., along an axis parallel to the conductors of one cable and orthogonal to the conductors of the other cable where the guide arranges the cables in mutually orthogonal relation.

Further detail concerning the cable of FIG. 1 and perforation guiding and making methods and apparatus is set forth in the following copending, commonly-assigned United States applications: Ser. No. 42,369, filed on May 25, 1979, entitled "Multiconductor Cable Arrangement and Electrical Connection"; Ser No. 42,440, filed on May 25, 1979, entitled "Method for Electrical Connection of Flat Cables"; Ser No. 42,442, filed on May 25, 1979, entitled "Apparatus and Method for Electrical Connection of Multiconductor Cables"; and Ser. No. 42,534, filed on May 25, 1979, entitled "Punch and Crimp Apparatus", incorporating reference being hereby made to all of the foregoing applications. The last-noted application discloses tools for both perforating and crimping functions and includes facility, as in the FIG. 12 arrangement above, for selection of any one of a plurality of predetermined connection patterns.

In providing the foregoing interrelated parts, connectors are selected to have insulation piercing expanse which conforms to the common width of conductors. Thus, by limiting such insulation piercing expanse to an area of no greater than a square of side length equal to the common conductor width, one assures that no connector will span plural conductors of one cable. Where the connector brings insulation piercing means into engagement with outer sides of plural cables, as in the case of the bendable connector of FIGS. 3 and 4, the insulation piercing expanse is no greater than the above-stated area for each cable side. In such preferred connector, the insulation piercing expanse is defined collectively by the teeth extending from one of the connector arms.

Various changes to the foregoing specifically disclosed embodiment and practices will be evident to those skilled in the art. Accordingly, the foregoing preferred embodiments are intended in an illustrative and not in a limiting sense. The true spirit and scope of the invention is set forth in the following claims:

What is claimed is:

1. A kit of parts for use in the installation of a wiring system, comprising:
    (a) flat electrical cable having a plurality of elongate conductors disposed in an electrically insulative casing and having an electrically conductive shield displaceably overlying said casing and electrically connected to one of said conductors; and
    (b) connection means adapted for receiving first and second such cables in mutually overlapping shield-displaced relation and providing for predetermined mutual alignment thereof, said connection means limiting connection of conductors of said first cable to conductors of said second cable to preselected zones of the plurality of zones available for making connection therebetween; and
    (c) means for identifying for connection use less than all of said preselected zones.

2. The invention claimed in claim 1 wherein said connection means provides for mutual orthogonal alignment of cables received thereby.

3. The invention claimed in claim 1 wherein said connection means provides a preselected zone for connection of an outermost conductor of said first cable to an outermost conductor of said second cable on such receipt and alignment thereof.

4. The invention claimed in claim 3 wherein such connection means provides a further preselected zone for connection of a conductor of said first cable adjacent said outermost conductor thereof to a conductor of said second cable adjacent said outermost conductor thereof.

5. The invention claimed in claim 1 wherein said means (c) includes selector means variably settable to provide for connection use of any one of a plurality of predetermined patterns of said preselected zones.

6. The invention claimed in claim 1 wherein said connection means includes means for making perforations through cable received thereby.

7. The invention claimed in claim 6 wherein said connection means includes means for containing material perforated from cable received thereby.

8. The invention claimed in claim 1 wherein said connection means comprises stencil means adapted to overlie cable received thereby, said stencil means having openings therethrough in predetermined pattern and registering with such preselected zones.

9. The invention claimed in claim 8 wherein said means (c) includes apertured means indexible with respect to said stencil means for selectively exposing said stencil means openings.

10. The invention claimed in claim 1 wherein said means (c) comprises indicia in said connection means including a common indicium for identifying plural of said preselected zones.

11. The invention claimed in claim 10 wherein each said casing includes indicia corresponding to such means (c) indicia.

12. A kit of parts for use in the installation of a wiring system, comprising:
    (a) flat electrical cable having a plurality of elongate conductors in an electrically insulative casing and having an electrically conductive shield displaceably overlying said casing and electrically connected to one of said conductors; and
    (b) connection means adapted for receiving and aligning such flat cable in shield-displaced condition and for perforating said casing in any selected one of a plurality of predetermined perforation patterns, connection zones of such patterns being collectively established in said connection means and being applied to said cable in registry with said conductors by virtue of such alignment, said connection means including means for limiting connection use of said connection zones to connections corresponding to said patterns.

* * * * *

UNITED STATES PATENT AND TRADEMARK OFFICE
CERTIFICATE OF CORRECTION

PATENT NO. : 4,315,662

DATED : February 16, 1982

INVENTOR(S) : William S. Greenwood et al

It is certified that error appears in the above–identified patent and that said Letters Patent are hereby corrected as shown below:

Column 6, line 67, "TAP 3-4-5 WIRE" should be -- TAP 4-5 WIRE --

*Signed and Sealed this*

*Twenty-second* Day of *June 1982*

[SEAL]

Attest:

GERALD J. MOSSINGHOFF

*Attesting Officer*     *Commissioner of Patents and Trademarks*